United States Patent
Kimura et al.

(10) Patent No.: US 7,583,817 B2
(45) Date of Patent: Sep. 1, 2009

(54) OBJECT DETERMINING APPARATUS

(75) Inventors: Yoshikatsu Kimura, Nisshin (JP); Yoshiki Ninomiya, Nagoya (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 737 days.

(21) Appl. No.: 11/356,976

(22) Filed: Feb. 21, 2006

(65) Prior Publication Data
US 2006/0193511 A1 Aug. 31, 2006

(30) Foreign Application Priority Data
Feb. 25, 2005 (JP) ............................. 2005-051353

(51) Int. Cl.
*G06K 9/00* (2006.01)
(52) U.S. Cl. ...................... 382/104; 382/154
(58) Field of Classification Search ................ 382/104, 382/106, 154; 356/3.13, 3.14; 348/135, 348/139; 340/435, 436
See application file for complete search history.

(56) References Cited
U.S. PATENT DOCUMENTS

| | | | | |
|---|---|---|---|---|
| 6,310,546 B1 * | 10/2001 | Seta | ........................... | 340/507 |
| 6,813,370 B1 * | 11/2004 | Arai | ............................. | 382/104 |
| 7,218,758 B2 * | 5/2007 | Ishii et al. | .................... | 382/104 |
| 7,386,163 B2 * | 6/2008 | Sabe et al. | ................... | 382/153 |
| 2002/0134151 A1 * | 9/2002 | Naruoka et al. | ............... | 73/291 |
| 2004/0252864 A1 * | 12/2004 | Chang et al. | ................ | 382/104 |

FOREIGN PATENT DOCUMENTS

| | | | |
|---|---|---|---|
| JP | 5-265547 A | 10/1993 | |
| JP | 9-81755 A | 3/1997 | |

* cited by examiner

*Primary Examiner*—Andrew W Johns
(74) *Attorney, Agent, or Firm*—Oblon, Spivak, McClelland, Maier & Neustadt, P.C.

(57) ABSTRACT

An object determining apparatus is disclosed which is structured such that right and left disparity images are acquired from different view points, disparity of corresponding points in the right and left images is computed, information relating to the points for which disparity is computed is voted to respective blocks of a disparity map that arranges blocks with one side corresponding to disparity, other side corresponding to image lateral position, and these sides being elongated with increasing disparity. An attribute of three dimensional object is applied to first blocks in which distribution of voted disparity points in disparity direction is small and image vertical direction is large. An attribute of road surface is applied to second blocks in which distribution in disparity direction is large and image vertical direction small, thereby determining an object as a three dimensional object or road surface.

19 Claims, 8 Drawing Sheets

SUBJECT BLOCK

NEIGHBOR BLOCK

F I G. 6
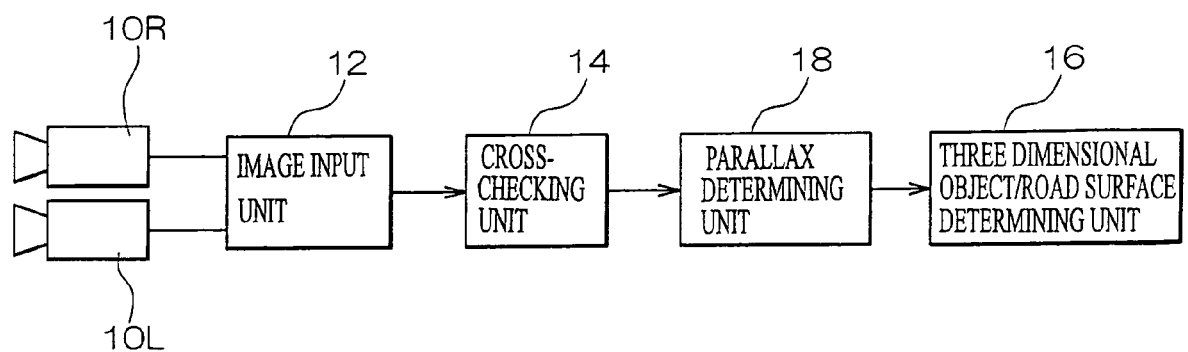

F I G. 8
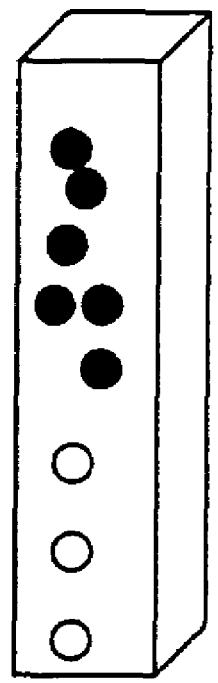
● DEFINITE THREE-DIMENSIONAL OBJECT PARALLAX
○ OTHERS

OBJECT DETERMINING APPARATUS

CROSS-REFERENCE TO RELATED APPLICATION

This application claims priority under 35 USC 119 from Japanese Patent Application No. 2005-51353, the disclosure of which is incorporated by reference herein.

BACKGROUND OF THE INVENTION

1. Field of the Invention

The present invention relates to an object determining apparatus, and more particularly to a object determining apparatus for use with a vehicle for determining whether an object in front of the vehicle is a three-dimensional object or a road surface.

2. Description of the Related Art

There has been conventionally known a external monitoring apparatus for a vehicle that differentiates road and three-dimensional objects on the basis of a height from a road surface (Japanese Patent Application Laid-Open (JP-A) No. 5-265547). In the case of detecting the road by the vehicle external monitoring apparatus, distance data close to the road surface (low height) is selected and by using a road model the road shape is detected. However, in order to detect a three-dimensional object, disparity points in which a height from the road surface is 10 cm or less is deleted from the previously found disparity points. Further, a histogram of the number of the disparity points is derived per lattice in which the disparity and the image width are fixed (in which a disparity resolution is 1, and an image has a width of 4 pixels), and a maximum value thereof is selected as data of a three-dimensional object.

Further, there has been proposed a plane estimating method for recognizing ground surfaces as a flat surfaces by globally approximating ground surfaces having few features, such as the road surface, the floor and the like, to flat surfaces (JP-A No. 9-81755). In this plane estimating method, a linear approximation is executed by finding the correspondence of blocks of m pixels×n pixels, finding a distance (a disparity point), picking up blocks in which a vertical position (iY) of the image exists within a common region, and using the blocks having the correspondence. A distance is interpolated with respect to the blocks having no correspondence by executing the linear approximation. Further, the road surface is detected by executing the linear approximation while changing the vertical position (iY) of the image, and executing an estimation of the plane in the entire image after the linear approximation is finished at all the vertical positions (iY) of the images.

However, in the prior art disclosed in JP-A No. 5-265547, since the road surface model is prepared by detecting the distance data close to the road surface, the distance data close to the road surface can not be detected in the case where a white line or the like does not exist on the road surface, giving cases where the road surface model can not be prepared. In the technique disclosed in JP-A No. 9-81755, it is possible to employ the technique even when the number of road patterns is small. However, since the road surface is globally approximated, there is a problem that a passenger standing on the road surface may be regarded as the plane.

Further, since the prior art employs blocks defined by fixed disparity intervals and image lateral position intervals, the size of the width of one element in a map becomes non-uniform with the distance and size in three-dimensional coordinates of real space. Therefore, since object are determined by a maximum value of the disparity and the votes of the disparity points to the map, there is a problem that it is hard to accurately determine the object.

SUMMARY OF THE INVENTION

The present invention is made in view of the above circumstances, and provides an object determining apparatus which can accurately determine an object by differentiating road surface and a three-dimensional object on the basis of local information instead of the road model and global approximation.

In accordance with a first aspect of the invention, there is provided an object determining apparatus comprising: a photographing unit for acquiring image data expressing a plurality of images having disparity by photographing an object from each of different view points; a processing unit for computing the disparity of corresponding points on the respective plurality of images on the basis of the image data expressing the plurality of images; a block determining unit for associating information relating to the disparity points from which disparity is computed to respective blocks of a disparity map that is constituted by arranging a plurality of blocks defined such that one side thereof corresponds to the disparity, the other side corresponds to a position in the lateral direction of the image and the side corresponding to the disparity and the side corresponding to the position in the lateral direction become longer in accordance with an increase of the disparity, and determining first block(s) in which a distribution of the associated disparity points in the disparity direction is small and a distribution in the image vertical direction is large, and second block(s) in which the distribution in the disparity direction of the associated disparity points is large and the distribution in the image vertical direction is small; and an attribute applying unit for applying the attribute of three dimensional object to the first block(s) and applying the attribute of road surface to the second block(s).

In accordance with a second aspect of the invention, there is provided an object determining apparatus comprising: a photographing unit for acquiring image data expressing a plurality of images having disparities by photographing an object from respective different view points; a processing unit for computing the disparity of corresponding points on the respective plurality of images on the basis of the image data expressing the plurality of images, and, on the basis of the computed disparity and the position on the image of the disparity points used for computing the disparity, computing the position in real space for the disparity points in terms of a position in a lateral direction, a position in a height direction and a distance from the view point; a block determining unit for associating information relating to the disparity points from which disparity is computed to respective blocks of a disparity map that is constituted by arranging a plurality of blocks defined such that one side thereof corresponds to the distance, the other side corresponds to the position in the lateral direction, and the lengths of the respective sides are substantially equal to each other, and determining first block (s) in which a distribution of the associated disparity points in the distance direction is small and a distribution in the height direction is large, and second block(s) in which the distribution of the associated disparity points in the distance direction is large and the distribution in the height direction is small; and an attribute applying unit applying an attribute of three dimensional object to the first block(s) and applying an attribute of road surface to the second block(s).

Other aspects, features and advantages of the invention will become apparent from the following description taken in conjunction with the accompanying drawings.

BRIEF DESCRIPTION OF THE DRAWINGS

FIG. 6 is a block diagram showing a second embodiment in accordance with the invention.

FIG. 8 is a view showing attribution of definite three dimensional object.

DETAILED DESCRIPTION OF THE INVENTION

Figure 1:
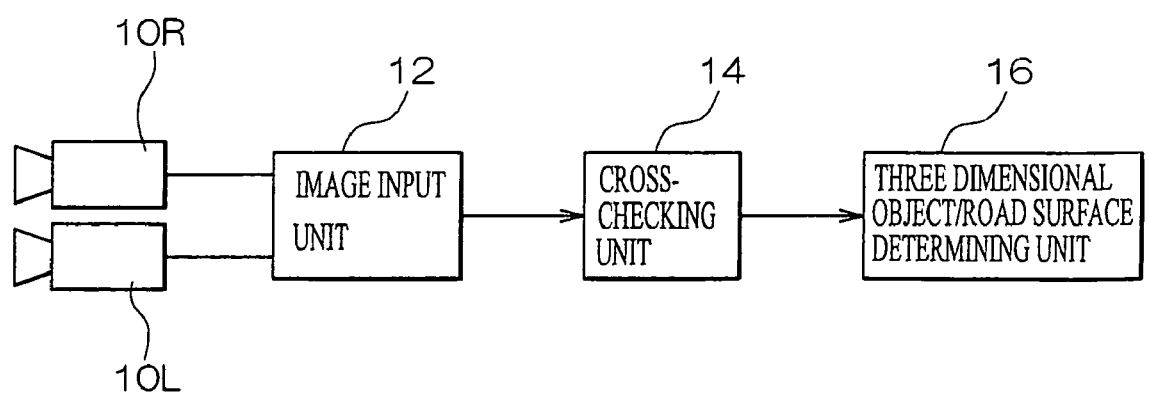
FIG. 1 is a block diagram of a first embodiment in accordance with the invention.

A description will be given in detail below of embodiments in accordance with the present invention with reference to the accompanying drawings. As shown in FIG. 1, a first embodiment is provided with a right camera 10R and a left camera 10L which are attached to an upper portion of a front window of a vehicle or the like at a predetermined interval so as to photograph the direction forward of the vehicle from different view points. The right camera 10R and the left camera 10L are constituted by a compact CCD camera or CMOS camera, photograph a region including the situation of the road in front of the vehicle, and output images of data obtained by the photographing.

Figure 2A:
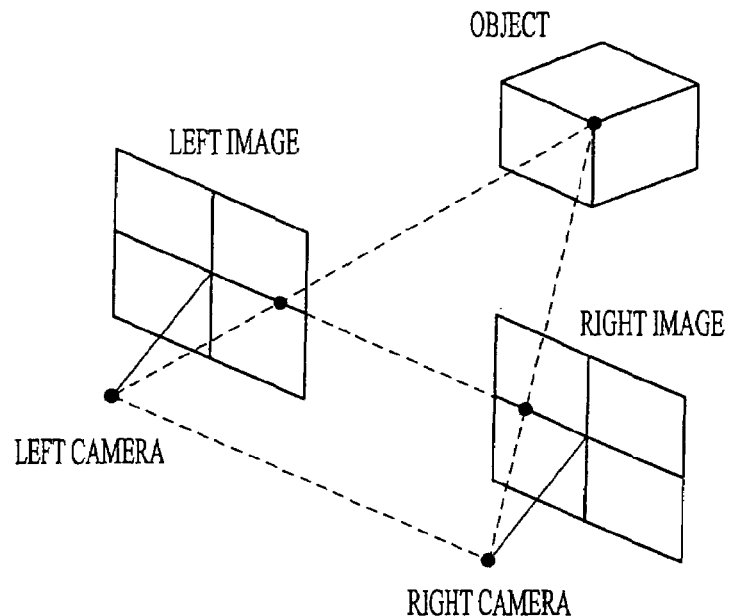
FIGS. 2A and 2B are diagrams explaining the principle of computing the disparity of right and left stereo images.
Figure 2B:
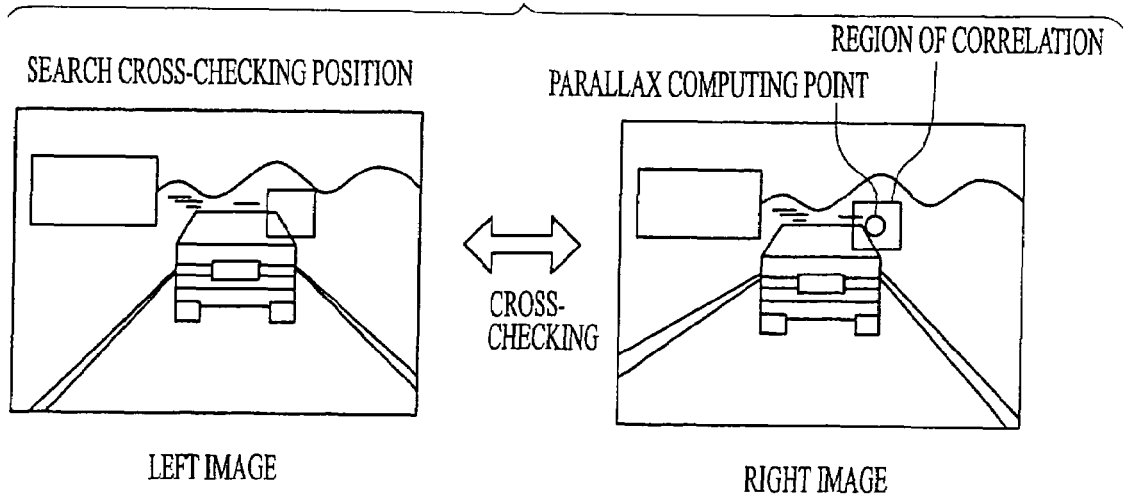

Since the right camera and the left camera are attached at the predetermined interval, a left image and a right image corresponding to a plurality of images having a disparity are obtained by photographing the object as shown in FIGS. 2A and 2B. Since the two obtained images have a disparity, it is possible to find the disparity (distance data) by stereo image process computing a distance to the object on the basis of the principle of trigonometrical observations by associating corresponding positions on the two images of corresponding points, corresponding regions and the like.

The above description is given of an example that the disparity images are acquired by photographing the object from the different view points while using a photographing apparatus provided with two cameras comprising a right camera and a left camera. However, the disparity image may be acquired using one camera to photograph the object from different view points by moving it back and forth in a lateral direction.

The right camera 10R and the left camera 10L are connected to an image input unit 12 provided with an A/D converter converting the image data obtained by the photographing into a digital signal. The image input unit 12 is connected to a matching unit 14 verifying the distance by detecting the degree of similarity between the right and left images so as to detect the disparity of corresponding points between the right and left images. In the matching unit 14, the disparity is computed by setting disparity computing points within correlation regions having a size of M×N in the left image and the right image as shown in FIG. 2, and using a summation of absolute differences (SAD). In other words, a correlation index S (iX, iY, d) is computed in accordance with the following expression, a value d (0≦d≦disparity detection width) minimizing the value of the correlation index S (iX, iY, d) is derived as the disparity iD at the disparity computing point (iX, iY), and the coordinates (iX, iY) and the disparity iD at the disparity computing point are output. In this case, sizes of the right image and the left image are each respectively V×H, where 0≦iX≦V and 0≦iY≦H.

$$S(iX, iY, d) = \sum_{m=0}^{M} \sum_{n=0}^{N} |R - L|$$

$$R = Ir(iX + m, iY + n)$$

$$L = Il(iX + m + d, iY + n)$$

where Ir denotes a comparison amount (brightness or the like) of each of comparison points of the image photographed by the right camera, Il denotes a comparison amount in each of comparison points of the image photographed by the left camera, M denotes the size of a correlation region in a vertical direction of the image, and N denotes the size of a correlation region in a lateral direction of the image.

In this case, in the matching unit 14, the disparity may be computed by using a sum of squares of the differences or a normalized function in place of a sum of absolute values of the differences.

The matching unit 14 is connected to a three dimensional object/road surface determining unit 16. The three dimensional object/road surface determining unit 16 votes the information at the disparity computing point to a block of the disparity map by using a disparity vote map explained in the following description, and determines whether a subject localized region belongs to a three dimensional object or to the road surface.

The matching unit 14 and the three dimensional object/road surface determining unit 16 can be constituted by a single micro processing unit (MPU). However, they may be constituted by independent MPUs.

Next, a description will be given of the determining process of the three dimensional object/road surface in accordance with the present embodiment with reference to FIG. 3. The disparity vote map shown in FIG. 4 is prepared in the three dimensional object/road surface determining unit 16. The disparity vote map is constituted by arranging a plurality of rectangular blocks defined such that the side in the lateral direction corresponds to the position on the screen in a lateral direction (direction of an axis iX), and the side in the vertical direction corresponds to the size of the disparity iD. Each of the blocks is defined in such a manner that the region thereof is enlarged in accordance with an increase of disparity, by elongating the length thereof in the lateral direction of the image in accordance with the increase of disparity and increasing the disparity resolution along with an increase of the disparity, that is, by elongating the length of the side corresponding to the disparity.

In the present embodiment, the disparity vote map is divided into a plurality of regions comprising planes 1 to 5, and each of the plurality of regions is defined so as to correspond to a predetermined disparity width. In the present embodiment, in the case where the disparity is expressed by 8 bits, the disparity vote map is defined in such a manner that plane 1 corresponds to a disparity of 0 to 15, plane 2 corresponds to a disparity of 16 to 31, plane 3 corresponds to a disparity of 32 to 63, plane 4 corresponds to a disparity of 64 to 127, and plane 5 corresponds to a disparity of 128 to 255.

Further, a size of each of the blocks of plane 1 is defined in such a manner that a lateral direction is N pixels and a vertical direction (disparity direction) is 1 pixel, a size of each of the blocks of plane 2 is defined in such a manner that a lateral direction is 2N pixels and a vertical direction (disparity direction) is 2 pixels, a size of each of the blocks of plane 3 is defined in such a manner that a lateral direction is 4N pixels and a vertical direction (disparity direction) is 4 pixels, a size of each of the blocks of plane 4 is defined in such a manner that a lateral direction is 8N pixels and a vertical direction (disparity direction) is 8 pixels, and a size of each of the blocks of plane 5 is defined in such a manner that a lateral direction is 16N pixels and a vertical direction (disparity direction) is 16 pixels. The blocks in each of the planes are arranged in a grid. In this case, N may be set, for example, to 4.

As in the present embodiment, an element constituting the disparity vote map, by defining the size of the block in such a manner that the region is enlarged on the screen in accordance with the increase of disparity, becomes approximately the same size as in three-dimensional real space Further, since the number of the blocks in the region having large disparity is reduced by constituting the disparity vote map in the manner mentioned above, it is possible to lower the capacity of memory storing the disparity vote map and the information corresponding to each of the blocks of the map.

In the three dimensional object/road surface determining unit 16, when the disparity iD computed by the matching unit 14, and the information relating to the disparity including the coordinates (iX, iY) are input to the three dimensional object/road surface determining unit 16, the blocks of the disparity vote map and the information relating to the disparity computing points are associated by voting the information relating to the disparity to the block of the disparity vote map corresponding to the disparity iD and the coordinate iX. Further, after voting the disparity computing points for which the matching has been carried out by the collating unit, that is, after the voting of all the disparity computing points for which the disparity has been computed is finished, the following information is computed with respect to each of the blocks, and stored in the memory corresponding to each of the blocks: the number of votes of the disparity computing points, the average of the disparity iDs, the deviation of the disparity iDs, the average of the coordinate iYs in the vertical direction of the image, and the deviation of the coordinate iYs in the vertical direction.

Figure 3:
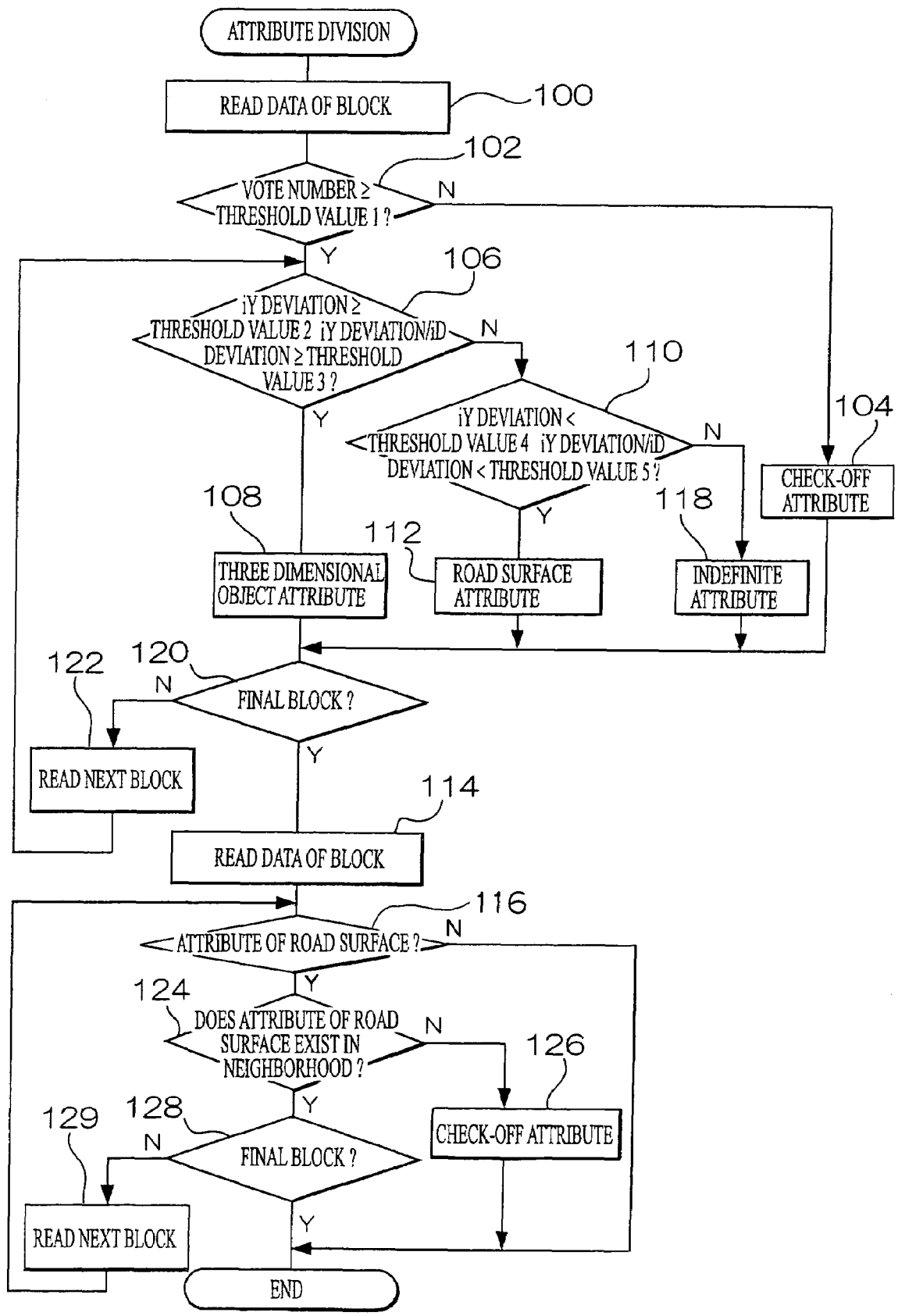
FIG. 3 is a flow chart showing an object determining routine in accordance with the first embodiment.
Figure 4:
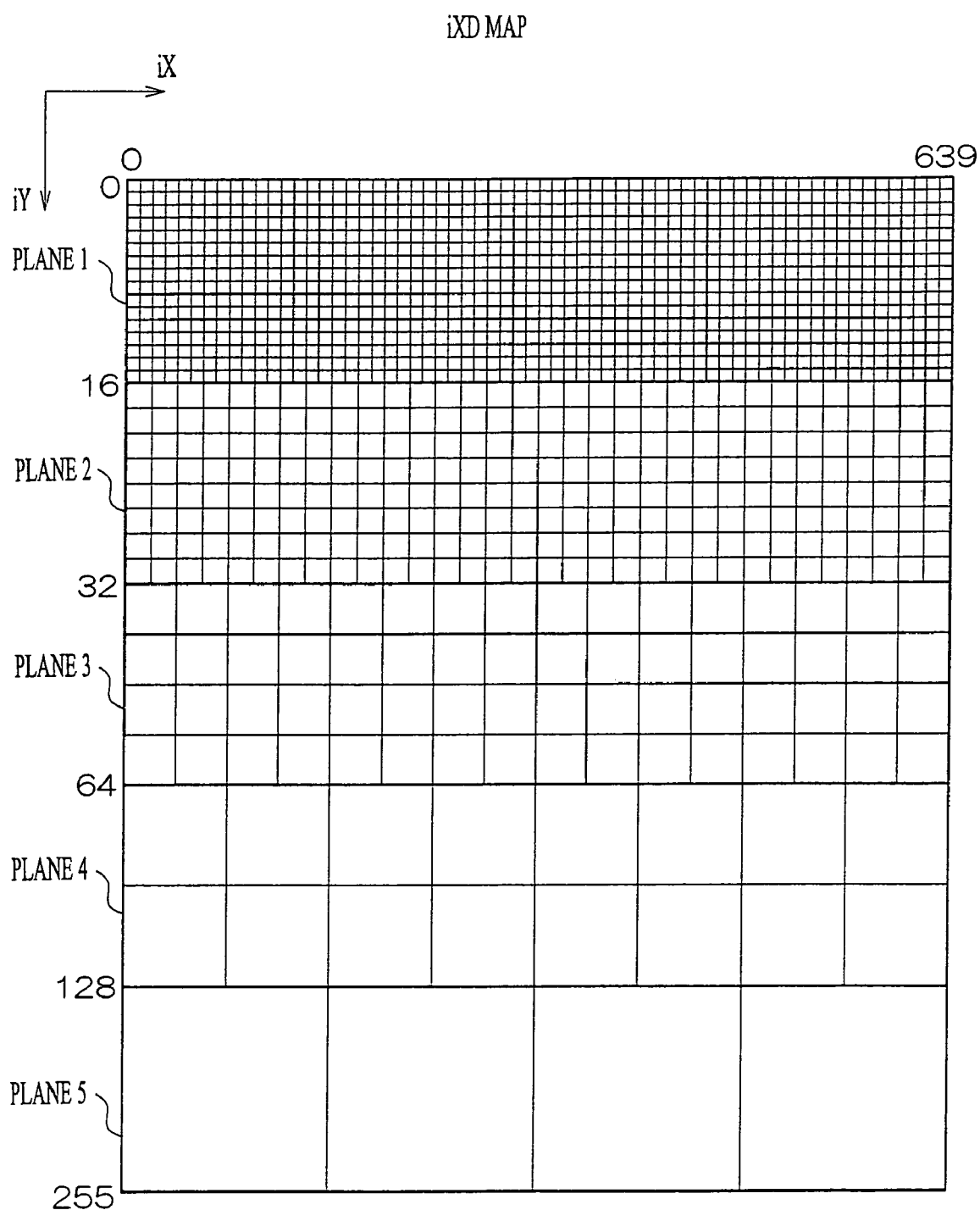
FIG. 4 is a view showing a disparity vote map.

In step 100 in FIG. 3, the number of votes, the deviation of the coordinate iYs and the deviation of the disparity iDs stored in correspondence to each of the blocks are read with respect to one block, and step 102 determines in each of the blocks whether or not the number of votes is equal to or more than a threshold value 1 which is set for each plane. The correspondence of the right and left images can be achieved more easily for shorter distances, and the number of disparity computing points is greater. Accordingly, the threshold values 1 can be set to become larger step by step from the plane 1 toward the plane 5.

In the case where the number of votes is less than the threshold value 1, the number of the disparity computing points for which correspondence is achieved between the right and left images is small, and thus it is hard to determine whether the object corresponds to a three dimensional object or the road surface. Accordingly, step 104 sets an attribute for the block indicating it to be noise outside of the scope for determination.

In the case where step 102 determines that the number of votes to be equal to or more than the threshold value 1, step 106 determines whether or not: the deviation of the coordinate iYs is equal to or more than a threshold value 2; and a ratio of the deviation of the coordinate iYs with respect to the deviation of the disparity iDs (deviation of coordinate iY/deviation of disparity iD) is equal to or more than a threshold value 3. In the case where the deviation of the coordinate iY is equal to or more than the threshold value 2, it indicates that the disparity computing points are distributed widely in the vertical direction, and in the case where the ratio is equal to or more than the threshold value 3, it indicates that the distribution of the disparity computing points in the disparity direction is small, and determination is made that the object is a three dimensional object, and step 108 sets the attribute of the block as a three dimensional object.

On the other hand, in the case where a negative determination is obtained in step 106, step 110 determines whether or not: the deviation of the coordinate iY is less than a threshold value 4 (<threshold value 2); and the ratio (deviation of coordinate iY/deviation of disparity iD) is less than a threshold value 5 (<threshold value 3). In the case where the deviation of the coordinate iY is less than the threshold value 4, and the ratio is less than the threshold value 5, the distribution in the vertical direction of the disparity computing points is small, and the distribution in the disparity direction is large, and determines that the block relates to the road surface, and step 112 sets the block attribute to road surface.

On the other hand, in the case where a negative determination is obtained in step 110, that is, a block having the relationship that threshold value 4≦deviation of iY<threshold value 2, and threshold value 5≦deviation of coordinate iY/deviation of disparity iD<threshold value 3 determination cannot be made either as road surface or as a three dimensional object. Accordingly, step 118 sets the attribute of the block to indefinite.

Next step 120 determines whether or not the block determined as mentioned above corresponds to the final block. In the case where the block does not correspond to the final block, step 122 reads the information relating to the disparity computing point of the next block, the same processes as mentioned above are executed, and the processes mentioned above are repeated until the determination of attributes is finished with respect to all the blocks.

Figure 5:
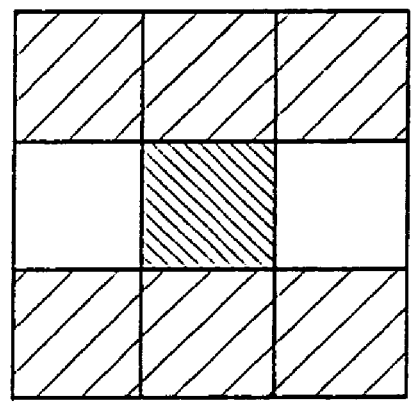
FIG. 5 is a view a subject block for setting the attribution to road surface and the blocks near the subject block.
Figure 5:
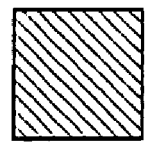
Figure 5:
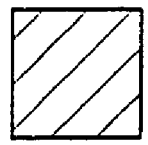

After determination for all the blocks is finished, step 114 reads the attribute data of a first block, and step 116 determines whether or not it is the attribute of road surface. If it is not the attribute of road surface, the routine is finished. In the case where it is the attribute of road surface, step 124 determines whether or not a block in which the attribute is set as road surface exists near the block (the subject block) in which the attribute of road surface is set, as shown in FIG. 5. In a case where no blocks in which the attribute is set to road surface exist in the neighborhood, step 126 changes the setting such as to turn off the attribute of the block in which the attribute of the road surface is set.

In the case where the attribute of road surface exists in the neighborhood, step 128 determines whether or not it is the final block. When it is not the final block, after reading the attribute data of the next block in step 129 the sequence returns to step 116 and the processes mentioned above are repeated, whereby it is determined whether or not a block exists in the neighborhood in which the attribute is set as road surface, with respect to all the blocks.

Since the road surface is generally continuous in the vertical direction of the screen, it is possible to improve the precision for determining the road surface by changing the attribute of the road surface set as mentioned above to the checked-off attribute when a neighboring block does not exist with the attribute set as road surface.

It is possible to execute the determination of the road surface/three dimensional object per block, that is, per local region, and it is possible to determine whether an object is a three dimensional object or road surface, by using the determinations per local regions.

The above description is given using an example in which one side corresponds to the disparity, the other side corresponds to the position in the lateral direction of the image, and the disparity map is obtained by arranging a plurality of blocks defined such that the side corresponding to the disparity, and the side corresponding to the position in the lateral direction, become longer in accordance with an increase of the disparity. However, since the amount of disparity is related to a distance Z from the camera in three-dimensional real space to the object, and the position in the lateral direction of the image corresponds to the position in the lateral direction in the three-dimensional real space (in the X-axis direction), and the position in the vertical direction of the image is related to the position in the height direction in three-dimensional real space, it is possible to employ a configuration obtained by arranging a plurality of blocks defined such that one side corresponds to the distance Z, the other side corresponds to the position in the lateral direction in three-dimensional real space, respectively, and the size thereof is the same. In this case, the disparity vote map may be structured by arranging a plurality of blocks in which the sizes of the respective sides are identical, for example, a plurality of blocks having the same size of 50 cm×50 cm in a lattice shape.

In the case of employing the disparity vote map obtained by arranging a plurality of blocks having the same size, the attribute of three dimensional object is applied to a block when it is determined that the number of disparity computing points is equal to or more than a predetermined value 1, the deviation in the height direction (the Y-axis direction) in the space coordinates is equal to or more than a predetermined value 2, and the ratio (deviation in height direction/deviation in distance direction (Z-axis direction)) is equal to or more than a predetermined value 3. The attribute of road surface is applied to a block when it is determined that the number of disparity computing points is equal to or more than the predetermined value 1, the deviation in the height direction is less than a predetermined value 4 (<predetermined value 2), and the ratio is less than a predetermined value 5 (<predetermined value 3). And the attribute of the indefinite is set for a block having the relationship such that predetermined value 4≦deviation in height direction<predetermined value 2, and predetermined value 5≦deviation in height direction/distance direction<predetermined value 3, because it cannot be determined either as road surface or as a three dimensional object.

Figure 7:
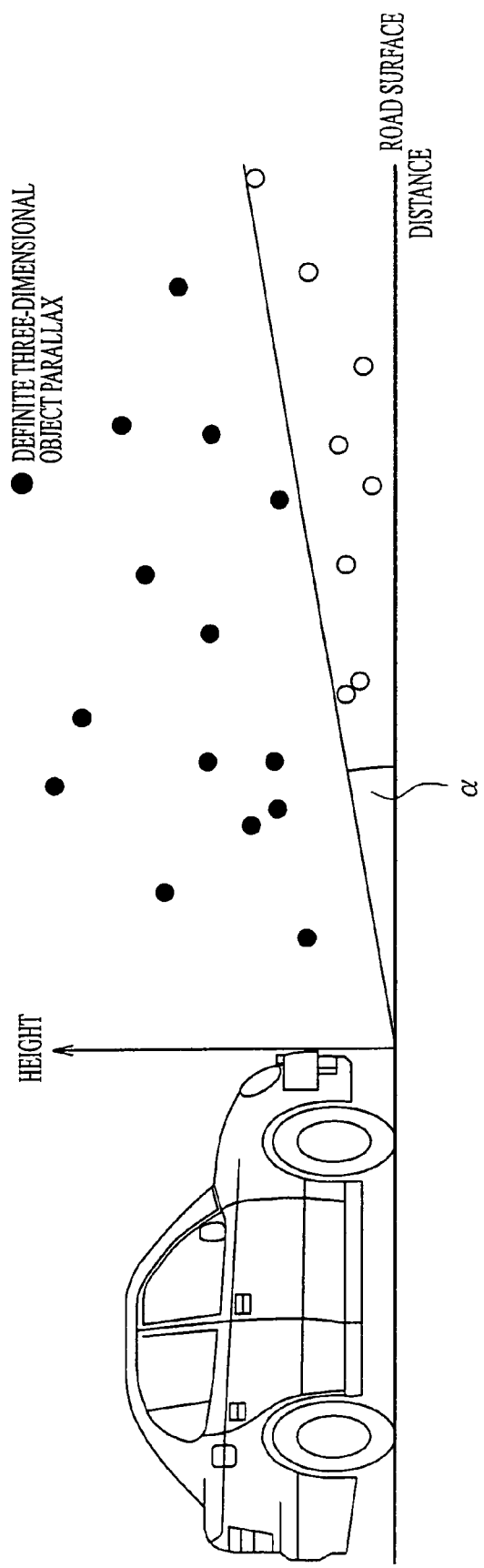
FIG. 7 is a view showing definite three dimensional object disparity points.

Next, a description will be given of a second embodiment. The present embodiment is structured, as shown in FIG. 6, such that a disparity determining unit 18 that determines definite three-dimensional object disparity is connected between the matching unit 14 and the three dimensional object/road surface determining unit 16 of the first embodiment. The disparity determining unit 18 determines disparity computing points positioned above a predetermined pitch angle α (for example, about 2 degrees) from the disparity computing points in which correspondence is established in accordance with matching, and defines the disparity of points positioned above the predetermined pitch angle α as definite three-dimensional object disparity. In the normal running state of the vehicle, since the pitch angle of the vehicle is about 2 degrees at the outside, disparity over the pitch angle is determined with certainty as disparity belonging to a three dimensional object, because the distribution of positions in the vertical direction, that is, the distribution of positions in the height direction, is large (see FIG. 7).

In the present embodiment, the disparity computing points positioned above the predetermined pitch angle α are defined as definite three-dimensional object disparity computing points and voted to the map. Step 102 in FIG. 3 determines whether or not the number of the definite three-dimensional disparity computing points is equal to or more than a predetermined value, for example, 50% of the disparity computing points within a given block. In the case where the number of definite three-dimensional disparity computing points is equal to or more than the predetermined value, the attribute is set to definite three dimensional object without executing the determinations in step 106 and step 110 (see FIG. 8). The attribute of definite three dimensional object is not changed even when it is later determined that the attribute is not three dimensional object due to the vehicle drive state. Accordingly, the upper portion of a vehicle, the upper portion of a wall and the like are not erroneously determined as road surface.

The specific embodiments in accordance with the invention are illustrated and described, however, it should be understood that the invention is not limited to these embodiments, and includes all the modifications and changes which can be derived from the scope and the spirit of the invention.

What is claimed is:

1. An object determining apparatus comprising:
a photographing unit for acquiring image data expressing a plurality of images having disparity by photographing an object from each of different view points;
a processing unit for computing the disparity of corresponding points on the respective plurality of images on the basis of the image data expressing the plurality of images;
a block determining unit for
associating information relating to the disparity points from which disparity is computed to respective blocks of a disparity map that is constituted by arranging a plurality of blocks defined such that one side thereof corresponds to the disparity, the other side corresponds to a position in the lateral direction of the image and the side corresponding to the disparity and the side corresponding to the position in the lateral direction become longer in accordance with an increase of the disparity, and
determining first block(s) in which a distribution of the associated disparity points in the disparity direction is small and a distribution in the image vertical direction is large, and second block(s) in which the distribution in the disparity direction of the associated disparity points is large and the distribution in the image vertical direction is small; and
an attribute applying unit for applying the attribute of three dimensional object to the first block(s) and applying the attribute of road surface to the second block(s).

2. The object determining apparatus as claimed in claim 1, wherein the block determining unit
computes a deviation of the disparities and a deviation of positions in the image vertical direction with respect to each of the blocks to which the information relating to the disparity points is associated,
and determines as first block(s) the block(s) in which the number of the associated disparity points is equal to or more than a first threshold value, the deviation of the positions in the vertical direction is equal to or more than a second threshold value, and a ratio of the deviation of the positions in the vertical direction with respect to the deviation of the disparities is equal to or more than a third threshold value, and determines as second block(s) the block(s) in which the number of the associated disparity points is equal to or more than the first threshold value, the deviation of the positions in the vertical direction is less than a fourth threshold value that is smaller than the second threshold value and a ratio of the deviation of the positions in the vertical direction with respect to the deviation of the disparities is less than a fifth threshold value that is smaller than the third threshold value.

3. The object determining apparatus as claimed in claim 2, wherein the attribute applying unit confirms the attribute of the second block(s) in a case where a block to which the attribute of the road surface is applied exists near to the subject second block.

4. The object determining apparatus as claimed in claim 2, wherein the processing unit computes the disparity on the basis of a correlation within corresponding regions of the respective plurality of images.

5. The object determining apparatus as claimed in claim 2, wherein the attribute applying unit applies the attribute of three dimensional object to a block that includes a predetermined count or more of disparity points existing in a region having a predetermined pitch angle or above, regardless of the determination result of the block determining unit.

6. The object determining apparatus as claimed in claim 1, wherein the attribute applying unit confirms the attribute of the second block(s) in a case where a block to which the attribute of the road surface is applied exists near to the subject second block.

7. The object determining apparatus as claimed in claim 6, wherein the processing unit computes the disparity on the basis of a correlation within corresponding regions of the respective plurality of images.

8. The object determining apparatus as claimed in claim 6, wherein the attribute applying unit applies the attribute of three dimensional object to a block that includes a predetermined count or more of disparity points existing in a region having a predetermined pitch angle or above, regardless of the determination result of the block determining unit.

9. The object determining apparatus as claimed in claim 1, wherein the processing unit computes the disparity on the basis of a correlation within corresponding regions of the respective plurality of images.

10. The object determining apparatus as claimed in claim 9, wherein the attribute applying unit applies the attribute of three dimensional object to a block that includes a predetermined count or more of disparity points existing in a region having a predetermined pitch angle or above, regardless of the determination result of the block determining unit.

11. The object determining apparatus as claimed in claim 1, wherein the attribute applying unit applies the attribute of three dimensional object to a block that includes a predetermined count or more of disparity points existing in a region having a predetermined pitch angle or above, regardless of the determination result of the block determining unit.

12. An object determining apparatus comprising:
a photographing unit for acquiring image data expressing a plurality of images having disparities by photographing an object from respective different view points;
a processing unit for computing the disparity of corresponding points on the respective plurality of images on the basis of the image data expressing the plurality of images, and, on the basis of the computed disparity and the position on the image of the disparity points used for computing the disparity, computing the position in real space for the disparity points in terms of a position in a lateral direction, a position in a height direction and a distance from the view point;
a block determining unit for
associating information relating to the disparity points from which disparity is computed to respective blocks of a disparity map that is constituted by arranging a plurality of blocks defined such that one side thereof corresponds to the distance, the other side corresponds to the position in the lateral direction, and the lengths of the respective sides are substantially equal to each other, and
determining first block(s) in which a distribution of the associated disparity points in the distance direction is small and a distribution in the height direction is large, and second block(s) in which the distribution of the associated disparity points in the distance direction is large and the distribution in the height direction is small; and
an attribute applying unit applying an attribute of three dimensional object to the first block(s) and applying an attribute of road surface to the second block(s).

13. The object determining apparatus as claimed in claim 12, wherein the block determining unit: computes a deviation of the distance and a deviation of the positions in the height direction with respect to each of the blocks to which the information relating to the disparity points is associated; determines as first block(s) block(s) in which the number of the associated disparity points is equal to or more than a first predetermined value, the deviation of the positions in the height direction is equal to or more than a second predetermined value, and a ratio of the deviation of the positions in the height direction with respect to the deviation of the distances is equal to or more than a third predetermined value; and determines as second blocks block(s) in which the number of the associated disparity points is equal to or more than the first predetermined value, the deviation of the positions in the height direction is less than a fourth predetermined value that is smaller than the second predetermined value, and a ratio of the deviation of the positions in the height direction with respect to the deviation of the distances is less than a fifth predetermined value that is smaller than the third predetermined value.

14. The object determining apparatus as claimed in claim 13, wherein the attribute applying unit confirms the attribute of the second block(s) in a case where a block to which the attribute of the road surface is applied exists near to the subject second block.

15. The object determining apparatus as claimed in claim 13, wherein the processing unit computes the disparity on the basis of a correlation within corresponding regions of the respective plurality of images.

16. The object determining apparatus as claimed in claim 13, wherein the attribute applying unit applies the attribute of three dimensional object to a block that includes a predetermined count or more of disparity points existing in a region having a predetermined pitch angle or above, regardless of the determination result of the block determining unit.

17. The object determining apparatus as claimed in claim 12, wherein the attribute applying unit confirms the attribute of the second block(s) in a case where a block to which the attribute of the road surface is applied exists near to the subject second block.

18. The object determining apparatus as claimed in claim 12, wherein the processing unit computes the disparity on the basis of a correlation within corresponding regions of the respective plurality of images.

19. The object determining apparatus as claimed in claim 12, wherein the attribute applying unit applies the attribute of three dimensional object to a block that includes a predetermined count or more of disparity points existing in a region having a predetermined pitch angle or above, regardless of the determination result of the block determining unit.

* * * * *